US009619757B2

(12) United States Patent
Wright

(10) Patent No.: US 9,619,757 B2
(45) Date of Patent: Apr. 11, 2017

(54) NOMINAL FEATURE TRANSFORMATION USING LIKELIHOOD OF OUTCOME

(71) Applicant: ADOBE SYSTEMS INCORPORATED, San Jose, CA (US)

(72) Inventor: Lars Wright, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 364 days.

(21) Appl. No.: 14/310,778

(22) Filed: Jun. 20, 2014

(65) Prior Publication Data

US 2015/0371147 A1 Dec. 24, 2015

(51) Int. Cl.
*G06F 15/18* (2006.01)
*G06N 99/00* (2010.01)
*G06F 17/30* (2006.01)
*G06Q 30/02* (2012.01)

(52) U.S. Cl.
CPC .......... *G06N 99/005* (2013.01); *G06F 17/30* (2013.01); *G06Q 30/02* (2013.01)

(58) Field of Classification Search
USPC .......................................................... 706/12
See application file for complete search history.

(56) References Cited

U.S. PATENT DOCUMENTS

| 2010/0250387 | A1* | 9/2010 | Kassaei | G06Q 10/00 |
| | | | | 705/26.1 |
| 2014/0365314 | A1* | 12/2014 | Torrens | G06Q 30/0269 |
| | | | | 705/14.66 |
| 2015/0371147 | A1* | 12/2015 | Wright | G06N 99/005 |
| | | | | 706/12 |

OTHER PUBLICATIONS

Machining-Based Coverage Path Planning for Automated Structural Inspection Charles Norman Macleod; Gordon Dobie; Stephen Gareth Pierce; Rahul Summan; Maxim Morozov IEEE Transactions on Automation Science and Engineering Year: 2016, Volume: PP, Issue: 99 pp. 1-12, DOI: 10.1109/TASE.2016.2601880 IEEE Early Access Articles.*

Will Fault Localization Work for These Failures? An Automated Approach to Predict Effectiveness of Fault Localization Tools Tien-Duy B. Le; David Lo 2013 IEEE International Conference on Software Maintenance Year: 2013 pp. 310-319, DOI: 10.1109/ICSM.2013.42 IEEE Conference Publications.*

A novel local success weighted ensemble classifier Raghvendra Kannao; Prithwijit Guha 2015 3rd IAPR Asian Conference on Pattern Recognition (ACPR) Year: 2015 pp. 469-473, DOI: 10.1109/ACPR.2015.7486547 IEEE Conference Publications.*

(Continued)

*Primary Examiner* — Michael B Holmes
(74) *Attorney, Agent, or Firm* — Shook, Hardy & Bacon L.L.P

(57) ABSTRACT

Embodiments of the present invention relate to transforming a nominal feature to a numeric feature that indicates a likelihood or probability of a particular outcome. Numeric features are determined that indicate a likelihood of an outcome given the value of the collected data (nominal values). Such numeric features are used to represent the corresponding nominal features for use in generating a machine learned model. As such, a nominal feature initially captured in a data set is transformed or converted to a numeric feature that represents a likelihood of a corresponding outcome as opposed to a Boolean value. Upon transforming nominal values to numeric values based on the likelihood of outcome, the numeric values can be used to generate a machine learned model that is used to predict future outcomes.

20 Claims, 4 Drawing Sheets

(56) References Cited

OTHER PUBLICATIONS

TV advertisement detection for news channels using Local Success Weighted SVM Ensemble Raghvendra Kannao; Prithwijit Guha 2015 Annual IEEE India Conference (INDICON) Year: 2015 pp. 1-6, DOI: 10.1109/INDICON.2015.7443801 IEEE Conference Publications.*

* cited by examiner

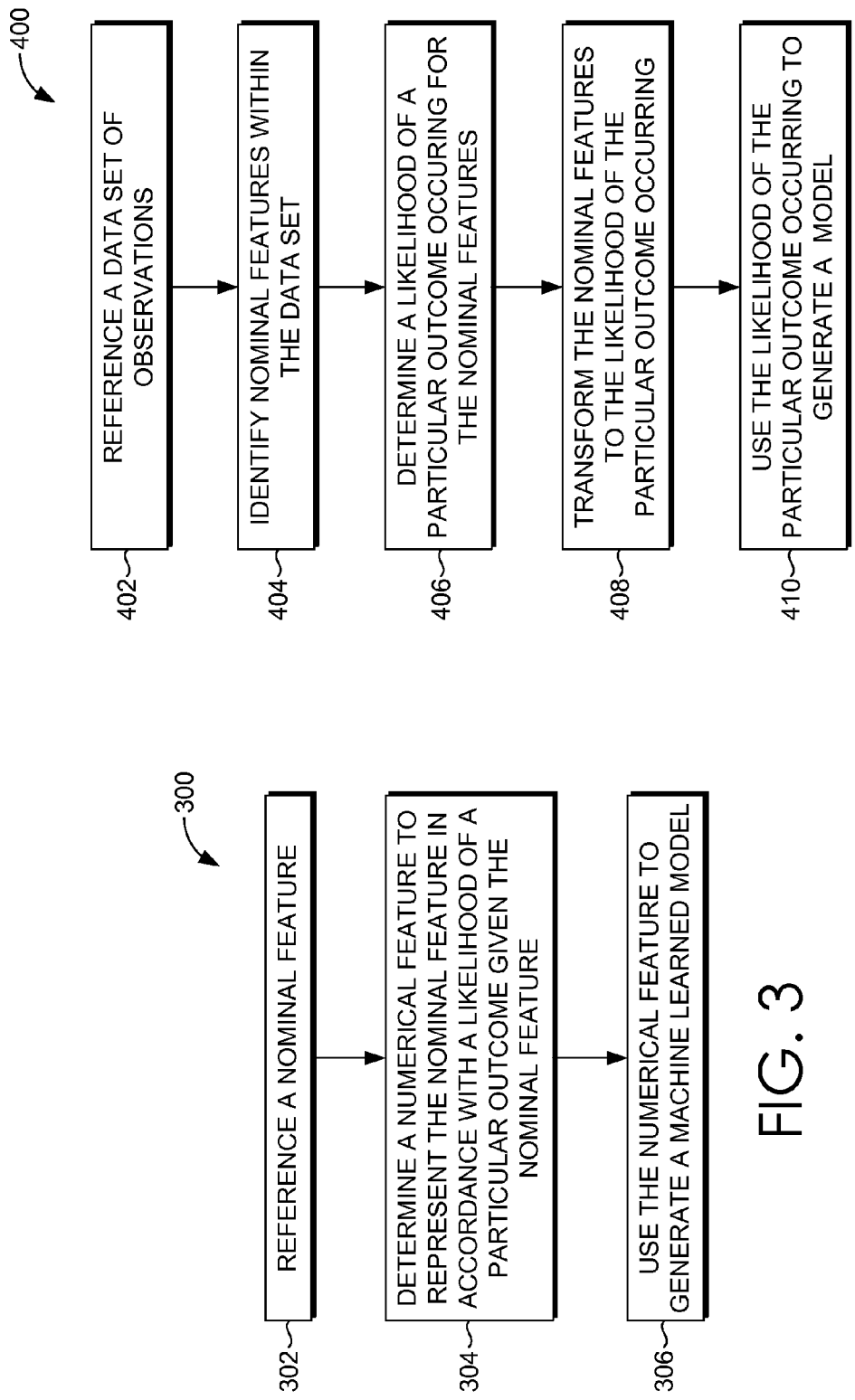

US 9,619,757 B2

NOMINAL FEATURE TRANSFORMATION USING LIKELIHOOD OF OUTCOME

BACKGROUND

In machine learning, a machine learned model is trained to infer a function from a collection of training data including features representing various aspects of the data. Oftentimes, features representing input data in a nominal or non-numeric manner are captured in the initial training data. Nominal values, however, can be difficult to use to generate a machine learned model. As a result, a nominal feature(s) is generally transformed or converted to a set of Boolean features. For example, a set of Boolean features that correspond with the number of possible values for a single nominal feature might be created. Converting a single nominal feature into a set of Boolean features to represent each potential value of the nominal feature can significantly increase the size of the input data and thereby impact storage and processing associated with machine learned models.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to transforming a nominal feature to a numeric feature that is a likelihood or probability of a particular outcome such that the size of the input data for generating a machine learned model is maintained. That is, nominal features are transformed to corresponding numeric features that represent a likelihood of an outcome given the value of the collected data. As such, a nominal feature initially captured in a data set is transformed or converted to a single numeric feature that represents a likelihood of a corresponding outcome as opposed to a Boolean value. Upon transforming nominal values to numeric values based on the likelihood of outcome, the transformed data set can be used to generate a machine learned model that is used to predict future outcomes.

BRIEF DESCRIPTION OF THE DRAWINGS

The present invention is described in detail below with reference to the attached drawing figures, wherein:

FIG. 3 depicts an exemplary flow diagram illustrating a method for generating models using likelihood of outcomes, in accordance with embodiments of the present invention;

FIG. 4 is an exemplary flow diagram illustrating another method for generating models using likelihood of outcomes, in accordance with embodiments of the present invention;

DETAILED DESCRIPTION

Figures 1, 2:
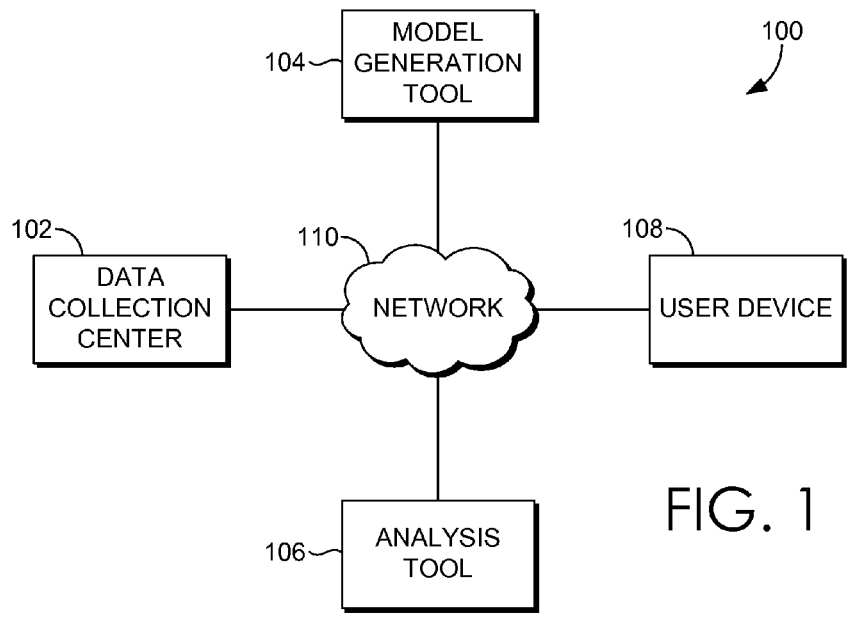
FIG. 1 is a block diagram of an exemplary computing environment suitable for use in implementing embodiments of the present invention.
FIG. 2 depicts an exemplary data matrix, according to embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In accordance with an occurrence or phenomenon being observed, raw features or data captured in data sets are oftentimes represented by nominal features or values. A nominal feature or a nominal value generally refers to a non-numeric value, such as a text string. Such nominal features, however, are difficult to utilize in generating a machine learned model that generalizes or predicts a future outcome. To this end, nominal features captured in data sets are transformed to numeric features such that the numeric features can be used to generate a machine learned model. Traditionally, nominal features are transformed to numeric features that are Boolean values, which are used to represent the initially captured nominal features. By way of example, assume that a nominal feature initially collected within a data set represents a state code within the United States in which a user resides or is located. Conventional approaches transform a given feature (e.g., CA) into an array of Boolean values that represent each of the potential unique values of the initial feature. As such, the state feature of CA might result in 50 Boolean features being created for a single record or observation such that the 50 Boolean features can be used to generate a machine learned model. That is, for each of the 50 states, a Boolean feature may be created that is either a 1 or a 0. In this example, the CA feature would be represented by a 1 while the remaining 49 state features would be represented by a 0.

As can be appreciated, for a feature that is associated with a larger set of possible values, this explosion of dimensionality is much more pronounced. Further, transforming a given feature into an array of Boolean values is generally performed for a number of observations, such as the set of observations to be used in generating a machine learned model. Expanding a feature(s) to an array of Boolean values can greatly increase the dimensionality associated with an observation and set of observations. Such a large quantity of data can result in utilization of a significant amount of storage for the data sets used for generating a machine learned model as well as the machine learned model itself.

In accordance with embodiments of the present invention, a value of a nominal feature is converted to or replaced with a likelihood or probability of a corresponding outcome such that the size of the input data for generating a machine learned model is maintained. That is, nominal features are transformed to numeric features that represent a likelihood of an outcome given the value of the collected data (nominal value). In this regard, a nominal feature initially captured in a data set is transformed or converted to a single numeric feature that represents a likelihood of a corresponding outcome as opposed to a Boolean value. Upon transforming nominal values to numeric values based on the likelihood of outcome, the transformed data set can be used to generate a machine learned model.

In utilizing a likelihood of outcome as a numeric feature to replace a nominal feature, one nominal feature transforms into only one numeric feature thereby reducing the dimensionality of the feature space. As a result, the model size is drastically reduced for complex models that consume these features, such as Random Forest™. For example, with prior approaches, a model size might be up to hundreds of megabytes thereby significantly constraining storage. By contrast, utilizing embodiments of the present invention, such a model size may be reduced to less than one megabyte.

Upon generating a machine learned model using likelihood of outcomes as features, the machine learned model can be used to predict an outcome, for example, based on new input data. Because the new input data may include a nominal value(s), such a nominal value(s) can be converted to a numeric value that is a likelihood of an outcome associated with the input data. The numeric value can then be used as a corresponding feature in the machine learned model. As a result of using a likelihood of outcome in association with the machine learned model, performance of a machine learned model can improve. For instance, outcomes for new input data can be predicted in a more accurate manner, as described in more detail below.

Various terms are used throughout this description. Although more details regarding various terms are provided throughout this description, general definitions of some terms are included below to provider a clearer understanding of the ideas disclosed herein:

A feature refers to a measurable property or attribute of an instance observed or being observed. A feature may be, for instance, a numeric feature or a nominal feature. By way of example, a feature may be any number of aspects measured or observed in association with a conversion of an advertisement to a sale of a good or service, such as a state in which a user resides, an age of the user, a gender of the user, an amount of time spent visiting a website, a date of a purchase, or the like.

A numeric feature refers to any feature that is represented by a numeral. For example, a numeric feature might be 0 representing a non-conversion, 1 representing a conversion, 25 representing an age of a user, 10.5 representing an amount of money paid to purchase an item, etc.

A nominal feature refers to any feature that is represented by a non-numeric value. A nominal feature may be any value that is not numerical, such as alphabetical text, or the like. For example, a feature indicating a two letter state code in which a user resides is one instance of a nominal feature.

A machine learned model refers to a model that is learned to infer a function from a collection of data. A machine learned model can be used to predict a likelihood, expected outcome, or score for a particular outcome or target. Such machine learned models generally include a set of one or more features that is used to generate an expected outcome or score. For example, many machine learning models compute an outcome or score, or category thereof, by linearly combining features with corresponding weights (coefficients) using a linear predictor function.

In accordance with various aspects of the invention, one embodiment of the present invention is directed to computer storage media storing computer-useable instructions that, when used by one or more computing devices, cause the one or more computing devices to perform operations comprising determining a numeric feature to represent a nominal feature, wherein the numeric feature comprises a likelihood of an outcome in accordance with the nominal feature. The numeric feature is then used to generate a machine learned model.

In another embodiment of the invention, an aspect is directed to a method. The method includes identifying a nominal feature within a data set to be transformed to a numeric feature, the nominal feature comprising a non-numeric value. For the nominal feature, a probability of a particular outcome occurring given the corresponding nominal feature is automatically generated. The nominal feature is transformed to a numeric feature based on the generated probabilities of the particular outcome occurring. The numeric feature is then used to generate a machine learned model.

A further embodiment is directed to one or more computer storage media storing computer-useable instructions that, when used by one or more computing devices, cause the one or more computing devices to perform operations. Such operations including obtaining a data associated with an observation for which a predicted outcome is desired, the data including a nominal feature. A numeric feature that corresponds with the nominal feature is referenced. The numeric feature comprises a likelihood of a predetermined outcome in accordance with the nominal feature. Thereafter, the numeric feature is inserted within a machine learned model to predict an outcome for the observation.

Having briefly described an overview of embodiments of the present invention, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 includes a data collection center 102, a model generation tool 104, an analysis tool 106, and a user device 108. It should be understood that the system 100 shown in FIG. 1 is an example of one suitable computing system architecture. Each of the components shown in FIG. 1 may be implemented via any type of computing device, such as computing device 600 described with reference to FIG. 6, for example. The components may communicate with each other via a network 110, which may include, without limitation, one or more local area networks (LANs) and/or wide area networks (WANs). Such networking environments are commonplace in offices, enterprise-wide computer networks, intranets, and the Internet.

It should be understood that any number of data collection centers 102, model generation tools 104, analysis tools 106, and user devices 108 may be employed within the system 100 within the scope of the present invention. Each may comprise a single device, or portion thereof, or multiple devices cooperating in a distributed environment. For instance, the model generation tool 104 and/or analysis tool 106 may be provided via multiple devices arranged in a distributed environment that collectively provide the functionality described herein. As another example, multiple data collection centers 102 may exist, for instance, to be located in remote locations, to increase storage capacity, or to correspond with distinct information (e.g., a separate data collection center for separate websites). Additionally, other components not shown may also be included within the network environment.

The data collection center 102 may collect data from any number of data sources and any type of data sources. In some cases, the data sources generally include any online presence at which website usage occurs or can be detected. In such cases, the data collection center 102 may access data from a web server(s) providing a website(s) and/or from a client device(s) at which a website(s) is being browsed or navigated. As can be understood, the data collection center 102 can contain any amount of data including raw or processed data. The collected data can be stored in a storage area, such as a database, for reference by the model generation tool 104, analysis tool 106, and/or user device 108. Any and all such variations of data sources and data associated with the data collection center 102 are contemplated to be within the scope of embodiments of the present invention.

Generally, the collected data is represented in the form of one or more matrices or data sets. A matrix or data set can be defined by a set of rows and a set of columns. The rows can represent users, objects, observations, customers, items, measurements, replications, records, or any other type of data. The columns can represent features, variables, covariates, predictors, attributes, factors, regressors, inputs, fields, or any other type of data. By way of example only, in one embodiment, the rows of a matrix represent various users, customers, or website visits, and the columns represent various features associated with such users, customers, or website visits. As illustrated in FIG. 2, FIG. 2 is a data matrix 200 pertaining to advertisement targeting. The rows of the data matrix 200 represent website visits, and the columns represent various corresponding data, such as an indication of an occurrence of a conversion 202, a state code 204 indicating a state in which a customer resides, a time of day 206, a customer income 208, or the like. Although advertisement data is illustrated in FIG. 2, any type of data is within the scope of embodiments of the present invention. Advertisement data is only one example of data that can be collected and utilized in accordance with embodiments described herein.

As can be appreciated, the data within the data collection center 102 can be updated or modified at any time in accordance with various implementations. For example, in some embodiments, data can be added to the data set in real-time or as realized by a computing device, such as a web server.

Irrespective of what the values or data entries within a data set represent, the model generation tool 104 generates a machine learned model using collected data. Machine learned models can be used to generalize or predict an expected outcome or score. Stated differently, machine learned models can provide a generalization for a future observation. Such machine learned models generally include a set of one or more features that is used to generate an expected outcome or score. For example, many machine learning models compute an outcome or score, or category thereof, by linearly combining features with corresponding weights (coefficients) using a linear predictor function. A linear predictor function refers to a linear function of a set of coefficients and features (e.g., independent variables) that are used to predict the outcome of a dependent variable. A feature may be an individual measurable property or attribute of an instance observed or being observed. In this way, a feature represents an attribute or aspect of something.

Equation 1 below provides an example of a basic form of a machine learning model or a linear predictor function:

$$y = ax + b \qquad \text{(Equation 1)}$$

wherein y is a dependent variable for which an outcome is predicted, x is a feature (e.g., independent variable), a is a weight or coefficient, and b is an offset (e.g., from a predetermined value, such as zero). As can be appreciated, a machine learned model can include any number of features x and corresponding weights a, such that a number of features can be utilized in combination to obtain an estimated outcome of y. Although a linear function (e.g., linear regression) is provided as an example of a machine learned model, embodiments of the present invention are not limited thereto.

Initially, the model generation tool 104 can select or identify a particular set of data to analyze from the data collection center 102 for purposes of generating or updating a machine learned model. In some cases, all of the data within the data collection center 102 might be analyzed to generate a model. In other cases, a portion of the captured data might be analyzed to generate a model. For example, a portion of the features or dimensions identified by columns might be analyzed. Alternatively or additionally, a portion of the records or observations identified by rows might be analyzed. For instance, an extent of the most recently captured records might be analyzed (e.g., within the last day or week) for purposes of generating or updating a machine learned model. Generating or generation used herein are intended to refer to an initial generation of a machine learned model and/or an updated machine learned model.

In accordance with aspects of the present invention, the model generation tool 104 transforms nominal values into numeric values using likelihood of outcome. In this regard, data items that are nominal (i.e., without numeric meaning) within an analyzed data set can be converted to numeric values. In some cases, the specific nominal values to transform to numeric representations might be predetermined, for example, as designated by a developer or as automatically determined in advance of initiating generation of a machined learned model. In other cases, nominal values to transform to numeric representations might be automatically identified at or near the time of initiating generating of a machine learned model. Automatic identification of nominal values to transform may be performed in any manner, including scanning and/or searching for non-numeric data (e.g., alphabetic data) or other indication of nominal values.

To transform, convert, or replace nominal values with numeric values in accordance with embodiments herein, a determination or calculation of a likelihood of an outcome is made. As used herein, likelihood of outcome refers to a likelihood or probability that a particular outcome will occur in association with a particular feature, that is, a feature value or category. A feature, feature value, or category can be any value, category, classification, etc. that is used to represent or describe an aspect or attribute of a particular observation. For example, a feature or feature value might be a state code indicating a U.S. state of residence, such as WA, CA, KS, MO, etc. As can be appreciated, a feature may also represent a range of values including a numeric range, such as 0-100, 100-200, 200-300, etc.

Likelihood of outcomes may be determined for any number of features. For example, in some cases, likelihood of outcomes may be computed for all potential features represented by nominal values (e.g., each of the 50 states). In other cases, likelihood of outcomes may be computed for a portion of possible feature categories represented by nominal values (e.g., only the features exposed in a data set, etc.).

In one implementation, a likelihood of an outcome for a particular feature is a proportion of the number observations having the particular feature that resulted in a specific outcome, occurrence, result, or target as compared to the total number of observations having the particular feature. A target or target variable refers to a variable within a set of data that is associated with data for which a learned model is directed to learning or predicting. A target or target variable may sometimes be referred to as a target label or ground truth.

By way of example only, assume that a measured target or outcome within a data set is whether a presentation of an advertisement converts to a product purchase. Further assume that state codes representing users' residences is a captured nominal feature (e.g., CA, TX, etc.) associated with each observation of visits to a website. Now assume that a likelihood of a conversion outcome is to be determined for the state code nominal feature represented by CA so that the nominal feature of CA can be converted to a numeric value. In such a case, the data set can be analyzed to determine the number of visits to the website resulting in a conversion when the user is indicated as residing in CA. The data set can be further analyzed to determine the total number of visits to the website when the user is indicated as residing in CA. Assuming that 40 visits to the website resulted in conversions by CA residents from among 1000 total visits to the website by CA residents, the likelihood of outcome for conversions is 0.04 or 4%. As such, the feature currently represented by CA can then be replaced by 0.04. Such a calculation can be performed for each possible type of feature associated with state code representing a residence of users (e.g., TX, WA, KS, NC, NY, etc.). As can be appreciated, in some cases, a likelihood of a particular outcome may be computed for each type of feature such that a likelihood of an outcome is not independently computed for the same feature presented in association with various observations. As such, in this example, a likelihood of a conversion when the user resides in California may be generally determined and, thereafter, used to replace all instances that the nominal feature of CA appears.

The transformed data can be stored in association with the original data set. In this manner, the initial nominal values can be replaced with the appropriate likelihood of outcome. In other embodiments, the transformed data can be stored as a new data set or in addition to the original data set.

Upon transforming nominal features to numeric features based on the likelihood of an outcome, the transformed data set can be used to generate a model, such as a machine learned model. In this regard, a machine learning algorithm can run on the transformed data to identify or generate a machine learned model that can be used to predict forthcoming outcomes given a set of inputs. Any machine learning or statistical algorithm can be used to generate a model and such an algorithm is not intended to limit the scope of embodiments of the present invention. By way of example only, and without limitation, a linear regression, a non-linear regression, or a Random Forests™ algorithm may be used to generate a machine learned model. Irrespective of the method or algorithm employed, such an algorithm determines a relationship between various features and a target (outcome for which a prediction is desired).

By way of example, and with particular reference to the simplified model set forth in Equation 1 above (y=ax+b), assume that a machine learned model is being generated for use in predicting how likely a conversion corresponds to a particular website visit. In such a case, y represents a target or score indicating a likelihood of conversion. x represents the likelihood of outcome generated for the particular feature. For instance, assuming a CA resident is associated with a 0.04 likelihood of outcome for a conversion when visiting the website, the x variable is replaced with a numeric value of 0.04. The coefficient a and the offset b can be derived using known, measured, observed, or calculated values input for x and y. In this manner, the coefficient a and the offset b are learned or inferred based on documented observations for use in the machine learned model.

The model generation tool 104 can perform model generation operations in real time (e.g., as data is recorded at the data collection center), in a batch methodology (e.g., upon a lapse of a time duration), or upon demand, for instance, when a request is made for marketing analytics. By way of example only, in some cases, the model generation tool 104 automatically initiates model generation, for instance, based on expiration of a time duration, upon recognition of new data, or the like. As another example, a user operating the user device 108 or another device might initiate model generation, either directly or indirectly. For instance, a user may select to run a "model generation update" to directly initiate the model generation tool 104. Alternatively, a user may select to view a marketing or conversion analysis or report, for example, associated with website usage or advertisement conversion, thereby triggering the model generation tool to generate or update a machine learned model. A user might initiate the functionality request directly to the data collection center 102 or model generation tool 104, for example, through a marketing analytics tool.

Although the model generation tool 104 is shown as a separate component, as can be understood, the model generation tool 104, or a portion thereof, can be integrated with another component, such as a data collection center, an analysis tool, a user device, a web server, or the like. For instance, in one embodiment, the model generation tool 104 is implemented as part of a marketing analysis server or other component specifically designed for marketing analysis. In another embodiment, the model generation tool 104 is implemented as part of a web server or other hardware or software component, or it can be implemented as a software module running on a conventional personal computer, for example, that is being used for marketing analysis.

Turning now to the analysis tool 106, the analysis tool 106 is configured to utilize a model, such as a model generated by the model generation tool 104, to analyze and predict data. The analysis tool 106 can use a machine learned model to predict a particular outcome or target. For example, a machine learned model might predict likelihood for a conversion of a displayed advertisement to a sale of a product. Machine learned models are invaluable in many environments. For example, in an exemplary environment of marketing analytics, predicting outcomes is desirable for any number of analyses performed on products and/or services, for example, associated with a website. Marketing analytics can include, for example, capturing data pertaining to conversions. In this regard, a variety of data can be identified including user data (e.g., user demographics, user location, etc.), links selected on a particular web page, advertisements selected, advertisements presented, conversions, type of conversion, etc. To assist in the collection and analysis of online analytics data, some marketing analysis tools, such as the ADOBE TARGET tool, have been developed that provide mechanisms to target content to users. With such tools, analyzing conversions, for example, results in more useful information being provided to users of the tools. In accordance with embodiments of the present invention, transforming nominal features associated with conversions to a numeric representation using likelihood of outcome to generate a machine learned model for predicting outcomes can improve efficiency and performance.

Although marketing analytics is one environment in which embodiments of the present invention may be implemented, any other environment in which machine learned models are generated may benefit from implementation of aspects of this invention. Further, although transforming nominal features to numeric features using likelihood of outcome is generally described herein for use in generating machine learned models, such transformation may also be utilized in generating other statistical models.

In accordance with obtaining new data or input, the analysis tool 106 can use a machine learned model to predict a particular outcome or target. To this end, the analysis tool 106 can reference the new data or input. Such data can be referenced (e.g., received, retrieved, accessed, etc.) from the data collection center 102 or other component. As can be appreciated, the data may be referenced in real-time, that is, as it is produced or collected, such that a prediction can be immediately determined and provided for use in real-time. Upon referencing the new data, nominal features presented within the new data may be converted or transformed to a numeric feature. In some cases, the numeric feature to which to convert or replace a nominal feature may be looked up or referenced, for example, from a data store associated with the analysis tool 106, the model generation tool 104, or the data collection center 102. In other cases, the numeric feature to which to convert or replace a nominal feature may be calculated, for instance, as described above with reference to the model generation tool 102.

The identified numeric features can be inserted into the machine learned model for use in predicting an outcome or target. By way of example only, assume that new data includes an indication that a user resides in California, as indicated by the state code CA. Further assume that the nominal feature CA corresponds with a likelihood of a conversion outcome of 0.04. The likelihood of outcome 0.04 can be looked up or determined in real time using the nominal feature of CA. Thereafter, the likelihood of outcome 0.04 can be used as the state feature in a machine learned model to generate a prediction of whether a conversion might occur for the current instance. As can be appreciated, any number of observed features might be used within a machine learned model to predict an outcome y.

In some embodiments, the likelihood of outcomes associated with features can be calculated frequently such that the machine learned model can be more accurate or up-to-date in real time. That is, the likelihood of outcomes for various features can be generated or updated frequently, and even in real-time (e.g., every second or every transaction), based on more recently captured observations or data sets. As such, nominal features of a current instance can be mapped to more recent likelihood of outcomes. Utilization of more current likelihood of outcomes within a machine learned model can generally result in a more accurate prediction for the current instance. In this regard, even though a machine learned model might not be generated or updated as frequently (e.g., every day or every week) to provide more accurate feature coefficients learned from more recent captured data, a predicted outcome for a current instance can nonetheless be more accurate in light of the numeric feature representing an updated likelihood of a particular outcome. The machine learned model can produce a more accurate outcome or target y using updated features represented by a likelihood of outcome prior to an updated model being built.

Estimated outcomes, y, or other data can be provided to the user device 108 or other device. As such, a user of the user device 108 can view data predictions and other corresponding data. In this regard, a data analysis performed using a machine learned model generated by and using a likelihood of outcome replacing nominal features can be presented to a user, for example, in the form of a data report. For instance, in an advertising analytics environment, reports or data associated with contextual targeted advertising can be provided to a user of a marketing analytics tool. Additionally or alternatively, a user visiting a website might be presented (e.g., via a user device) with a more appropriate or effective advertisement(s) as the machine learned model using likelihood of outcomes provided data indicating target advertisements contextually relevant to the user.

Turning now to FIG. 3, an exemplary flow diagram illustrating a method 300 for generating models using likelihood of outcomes is generally depicted. In embodiments, the method 300 is performed by the model generation tool 104 of FIG. 1, or other component(s) performing like functionality. Initially, at block 302, a nominal feature is referenced. Such a nominal feature may be referenced, for instance, in association with a data set captured at the data collection center 102 of FIG. 1. At block 304, a numeric feature to represent the nominal feature is determined. The numeric feature to represent the nominal feature is determined in accordance with a likelihood of a particular outcome given the nominal feature. Thereafter, at block 306, the numeric feature in the form of the likelihood of the outcome is used to generate a machine learned model. In this manner, likelihood of outcomes, as opposed to Boolean values, are used as numeric feature to represent an initially captured nominal feature.

With reference now to FIG. 4, an exemplary flow diagram illustrating a method 400 for generating models using likelihood of outcomes is generally depicted. In embodiments, the method 400 is performed by the model generation tool 104 of FIG. 1, or other component(s) performing like functionality. Initially, at block 402, a data set of observations is referenced. The data set may include any number of features as well as any number of observations. At block 404, nominal features within the data set are identified. For the nominal features, a likelihood of a particular outcome occurring based on the value of the nominal feature is determined. This is shown at block 406. In embodiments, the likelihood of the particular outcome occurring based on the value of the nominal feature is automatically computed by dividing the number of instances or observations having that nominal feature that resulted in a particular outcome or target (e.g., number of website visits resulting in a conversion where the user resides in California) divided by the total number of instances or observations having that nominal feature (e.g., total number of website visits where the user resides in California). As indicated at block 408, the nominal features are transformed to or replaced with the corresponding likelihood of the particular outcome. The likelihood of the particular outcome represents a numeric feature that is then used to generate a model, such as a machine learned model, as indicated at block 410. In this regard, the numeric feature(s) along with target variable(s) within the data set can be used to derive coefficients or weights, and any offset(s), for the numeric feature(s). The derived coefficients or weights, and any offset(s), can then be used for the machine learned model.

Figure 5:
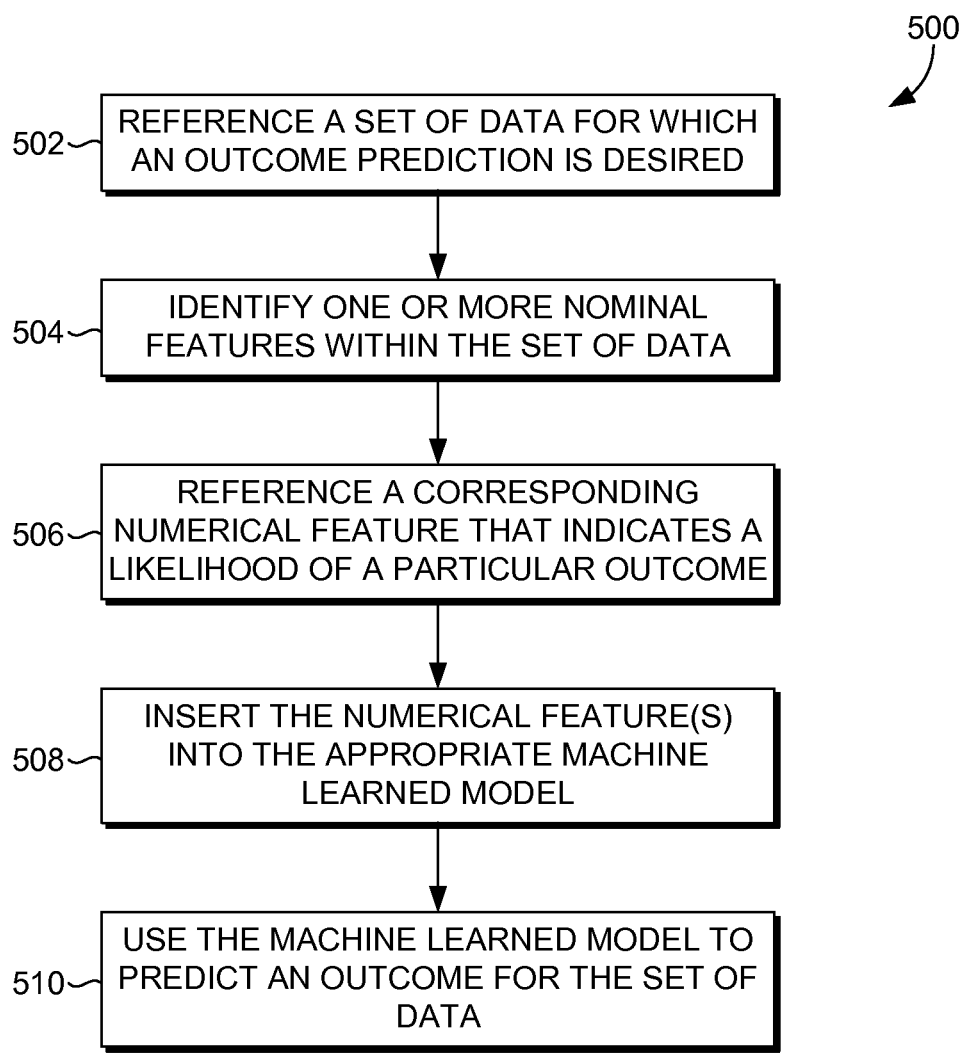
FIG. 5 is an exemplary flow diagram illustrating a method for using likelihood of outcomes in association with a model, according to embodiments of the present invention.

Turning now to FIG. 5, an exemplary flow diagram illustrating a method 500 for using likelihood of outcomes in association with a model is generally depicted. In embodiments, the method 500 is performed by the analysis tool 106 of FIG. 1, or other component(s) performing like functionality. Initially, at block 502, a set of data or an instance for which an outcome prediction is desired is referenced. Such a set of data might be data referenced from a data store or data produced in real-time. At block 504, one or more nominal features produced in the set of data are identified. In accordance with identifying the one or more nominal features, a corresponding numeric feature that indicates a likelihood of a particular outcome is referenced. This is indicated at block 506. In one implementation, the numeric feature may be looked up, for example, via a lookup table or mapping algorithm. In another implementation, the numeric feature may be calculated using a set of data, such as a set of trial data. At block 508, the numeric feature(s) is inserted into an appropriate machine learned model. The machine learned model is then used to predict an outcome for the set of data, as indicated at block 510.

Having described an overview of embodiments of the present invention, an exemplary computing environment in which some embodiments of the present invention may be implemented is described below in order to provide a general context for various aspects of the present invention.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 6:
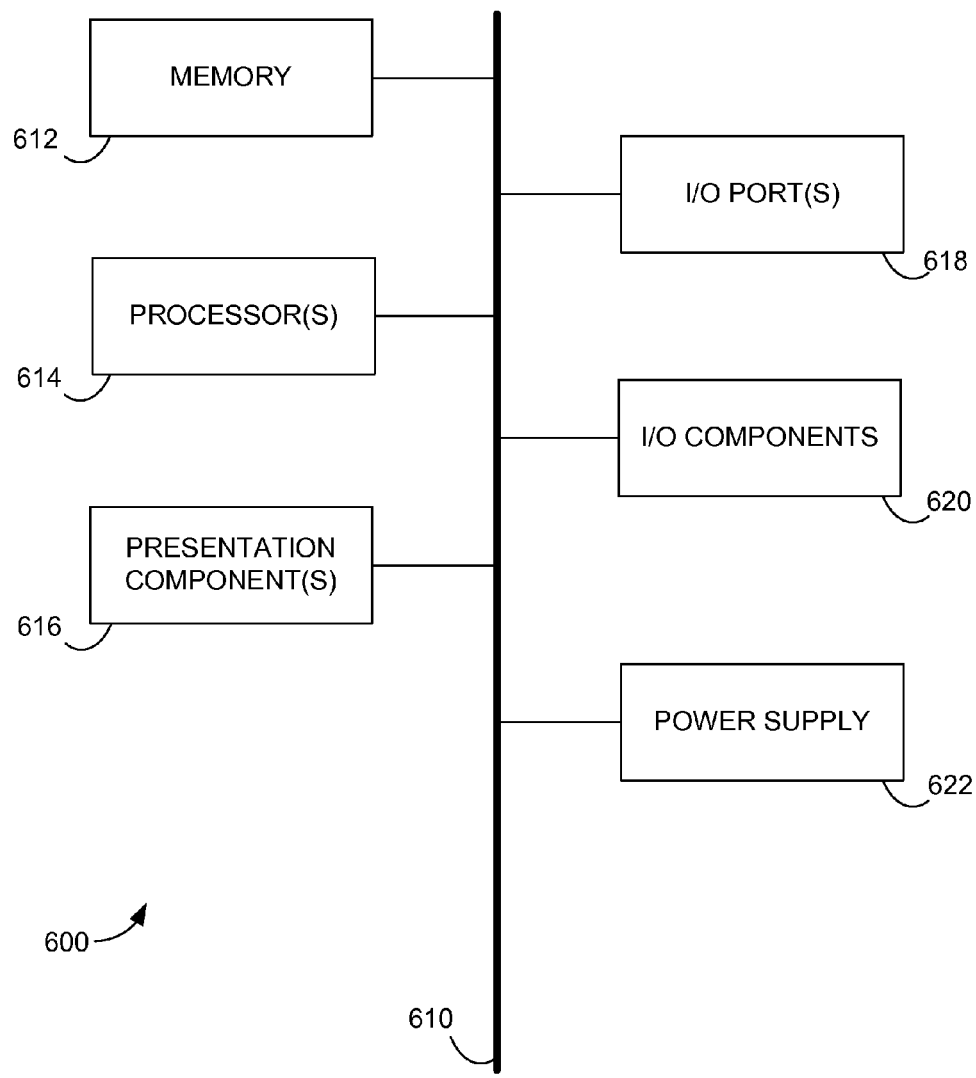
FIG. 6 is a block diagram of an exemplary operating environment suitable for use in implementing embodiments of the present invention.

Accordingly, referring generally to FIG. 6, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, transforming nominal features to numeric features using a likelihood of an outcome, and utilization of such numeric features. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to perform operations comprising:
   referencing a nominal feature captured in a data set, wherein the nominal feature comprises a non-numeric value;
   determining a numeric feature to represent the nominal feature, wherein the numeric feature comprises a likelihood of a specific outcome occurring based on the value of the nominal feature; and
   using the numeric feature to generate a machine learned model to be used to predict an outcome associated with a future observation instance.

2. The one or more non-transitory computer storage media of claim 1 further comprising identifying the nominal feature within the data set including a plurality of observations.

3. The one or more non-transitory computer storage media of claim 1, wherein the likelihood of the specific outcome is calculated by dividing a number of observations including the nominal feature that resulted in a target variable by a total number of observations including the nominal feature.

4. The one or more non-transitory computer storage media of claim 1, wherein the numeric feature is used to derive a coefficient associated with the numeric feature for the machine learned model.

5. The one or more non-transitory computer storage media of claim 1, wherein the machine learned model is used to predict the outcome associated with the future observation instance in real-time.

6. The one or more non-transitory computer storage media of claim 1 further comprising:
   determining a second numeric feature to represent a second nominal feature, wherein the second numeric feature comprises a likelihood of an outcome in accordance with the second nominal feature; and
   using the second numeric feature to generate the machine learned model.

7. The one or more non-transitory computer storage media of claim 1 further comprising replacing the nominal feature with the numeric feature.

8. The one or more non-transitory computer storage media of claim 1, wherein the machine learned model is used to predict the outcome associated with a website analysis.

9. A computerized method comprising:
   identifying one or more nominal features within a data set to be transformed to numeric features, each of the one or more nominal features comprising a non-numeric value;
   for each of the one or more nominal features, automatically generating a probability of a particular outcome occurring given the corresponding nominal feature using previously captured data;
   transforming the one or more nominal features to one or more numeric features based on the generated probabilities of the particular outcome occurring; and
   utilizing the one or more numeric features to generate a machine learned model to be used to predict an outcome associated with a future observation instance via a computing device.

10. The method of claim 9, wherein the data set includes data associated with a plurality of observations.

11. The method of claim 9, wherein the machine learned model is used to predict outcomes associated with web analytics.

12. The method of claim 9, wherein the machine learned model is used to predict outcomes associated with marketing analytics.

13. The method of claim 9, wherein the one or more numeric features are used to generate the machine learned model by deriving coefficients associated with each of the numeric features.

14. One or more non-transitory computer storage media storing computer-useable instructions that, when used by one or more computing devices, cause the one or more computing devices to perform operations comprising:
   obtaining data associated with an observation for which a predicted outcome is desired, the data including a nominal feature that has a non-numeric value;
   referencing a numeric feature that corresponds with the nominal feature, the numeric feature comprising a likelihood of a predetermined outcome based on the value of the nominal feature; and
   inserting the numeric feature within a machine learned model to predict an outcome for the observation, wherein the machine learned model is generated using a set of captured data having nominal values converted to corresponding numeric values.

15. The one or more non-transitory computer storage media of claim 14, wherein the nominal feature is an alphabetical text value.

16. The one or more non-transitory computer storage media of claim 14, wherein the numeric feature that corresponds with the nominal feature is looked up in a lookup system.

17. The one or more non-transitory computer storage media of claim 14, wherein the numeric feature that corresponds with the nominal feature is generated in real-time using a set of prior observations.

18. The one or more non-transitory computer storage media of claim 14, wherein the machine learned model is used to predict outcomes associated with web analytics.

19. The one or more non-transitory computer storage media of claim 14, wherein the machine learned model is used to predict outcomes associated with marketing analytics.

20. The one or more non-transitory computer storage media of claim 14 further comprising:
- obtaining data associated with a second observation for which a predicted outcome is desired, the data including the nominal feature;
- referencing an updated numeric feature that corresponds with the nominal feature, the updated numeric feature comprising a likelihood of a predetermined outcome in accordance with the nominal feature based on more recently captured data; and
- inserting the updated numeric feature within the machine learned model to predict an outcome for the second observation.

\* \* \* \* \*